United States Patent
Siegel et al.

(10) Patent No.: US 8,305,983 B2
(45) Date of Patent: Nov. 6, 2012

(54) METHOD AND APPARATUS FOR ENABLING REGISTRATION OF ENDPOINT DEVICES THROUGH PROVISIONING

(75) Inventors: Steven A. Siegel, Mendham, NJ (US); Dennis Duffy, Decatur, GA (US); Leticia D. Johnson, Helotes, TX (US); Stephanie P. Parlamas, Colts Neck, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 422 days.

(21) Appl. No.: 12/611,821

(22) Filed: Nov. 3, 2009

(65) Prior Publication Data

US 2010/0111049 A1    May 6, 2010

Related U.S. Application Data

(60) Provisional application No. 61/110,801, filed on Nov. 3, 2008.

(51) Int. Cl.
*H04W 4/00* (2009.01)
*H04W 40/00* (2009.01)
*H04L 12/28* (2006.01)
*G06F 15/16* (2006.01)

(52) U.S. Cl. ........ 370/329; 370/338; 370/352; 370/401; 455/435.1; 455/445; 709/203; 709/227

(58) Field of Classification Search .................. 370/329, 370/338, 352, 401; 455/435.1, 445; 709/203, 709/227
See application file for complete search history.

(56) References Cited

U.S. PATENT DOCUMENTS

| | | | | |
|---|---|---|---|---|
| 7,561,535 B2* | 7/2009 | Naqvi et al. | ................. | 370/260 |
| 7,912,042 B2* | 3/2011 | Falkena et al. | ................ | 370/352 |
| 7,936,665 B2* | 5/2011 | Ishii | ............................ | 370/216 |
| 2005/0041578 A1* | 2/2005 | Huotari et al. | ................ | 370/229 |
| 2006/0079236 A1* | 4/2006 | Del Pino et al. | ............. | 455/445 |
| 2006/0117187 A1* | 6/2006 | Hollatz et al. | ................ | 713/182 |
| 2006/0129646 A1* | 6/2006 | Rhee et al. | .................... | 709/206 |
| 2006/0245567 A1* | 11/2006 | Shaffer et al. | ............. | 379/209.01 |
| 2006/0268698 A1* | 11/2006 | Shaffer et al. | ................ | 370/230 |
| 2006/0291487 A1* | 12/2006 | Naqvi et al. | ................... | 370/401 |
| 2007/0088836 A1* | 4/2007 | Tai et al. | ....................... | 709/227 |
| 2007/0213078 A1* | 9/2007 | Shaheen | ....................... | 455/466 |
| 2008/0181198 A1* | 7/2008 | Yasrebi et al. | ................. | 370/352 |
| 2008/0194258 A1* | 8/2008 | Chiu et al. | ................. | 455/435.1 |
| 2008/0254795 A1* | 10/2008 | Ratcliffe et al. | ........... | 455/435.1 |
| 2008/0299980 A1* | 12/2008 | Buckley et al. | ............... | 455/445 |
| 2008/0317010 A1* | 12/2008 | Naqvi et al. | .................... | 370/355 |
| 2009/0086742 A1* | 4/2009 | Ghai et al. | .................... | 370/401 |
| 2010/0075642 A1* | 3/2010 | Ejzak et al. | ................. | 455/414.1 |
| 2010/0110978 A1* | 5/2010 | Falkena et al. | ................ | 370/328 |
| 2012/0014436 A1* | 1/2012 | Segall et al. | ............. | 375/240.12 |

* cited by examiner

*Primary Examiner* — Alpus H Hsu

(57) ABSTRACT

A method and apparatus for enabling registration of an endpoint device that is incapable of supporting a Session Initiation Protocol (SIP) based Internet Protocol Multimedia Subsystem (IMS) registration are disclosed. For example, the method performs a static registration of the endpoint device in a plurality network elements associated with an Internet Protocol Multimedia Subsystem (IMS) network by provisioning that is initiated by a service provider of the IMS network. The method processes an originating call request or a terminating call request associated with the endpoint device by an Application Server (AS) using the static registration, wherein the application server is one of the plurality network elements.

20 Claims, 6 Drawing Sheets

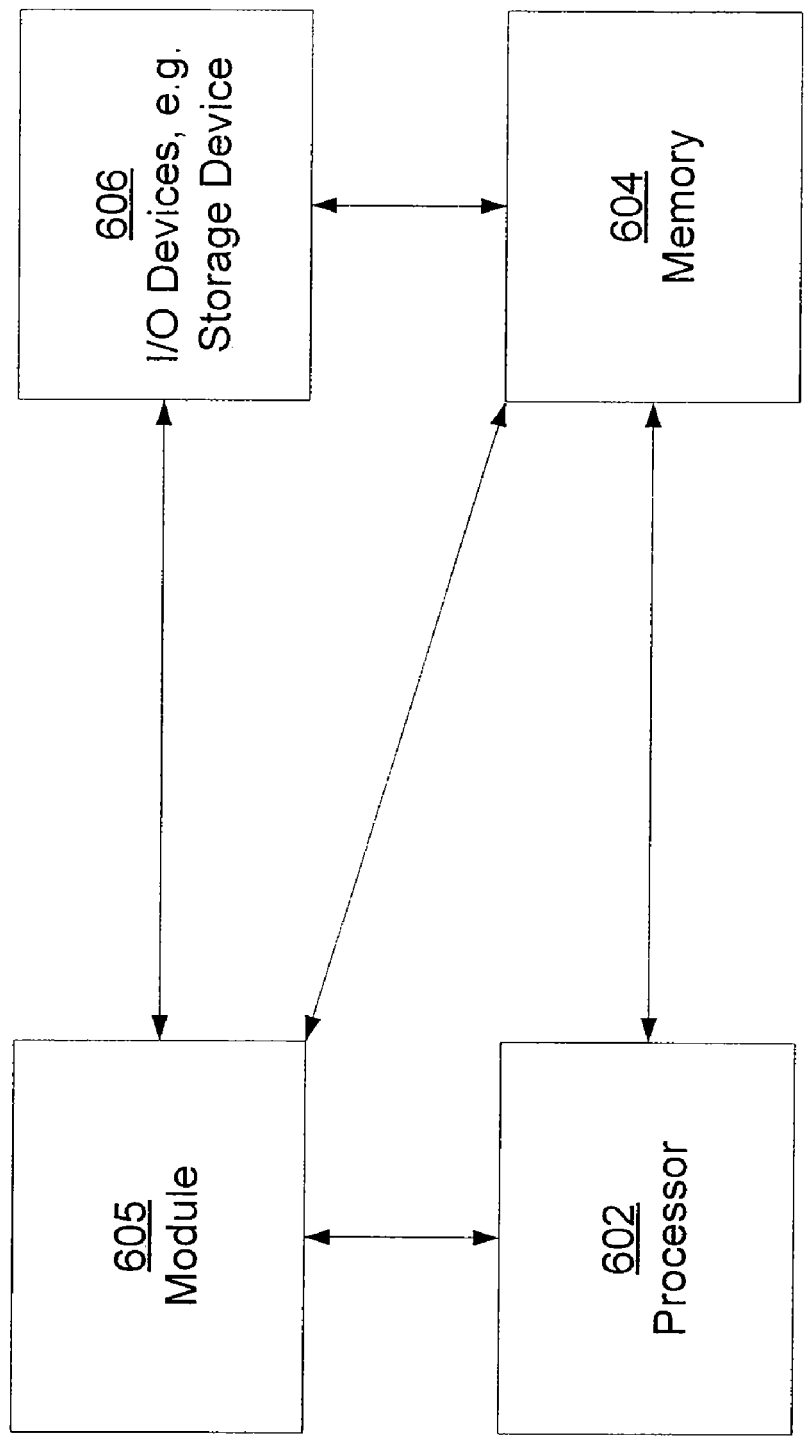

METHOD AND APPARATUS FOR ENABLING REGISTRATION OF ENDPOINT DEVICES THROUGH PROVISIONING

This application claims the benefit of U.S. Provisional Application No. 61/110,801 filed on Nov. 3, 2008, which is herein incorporated by reference.

The present invention relates generally to communication network and, more particularly, to a method and apparatus for enabling registration of endpoint devices that do not support Session Initiation Protocol (SIP) based Internet Protocol Multimedia Subsystem (IMS) registration, e.g., in a Fixed Mobile Convergence (FMC) network, through provisioning by a service provider.

BACKGROUND OF THE INVENTION

Fixed Mobile Convergence (FMC) capabilities or services allow a subscriber to access the same or near-equivalent features over both mobile and wireline devices. Many existing wireless phones are incapable of performing SIP based Internet Protocol Multimedia Subsystem (IMS) registrations and are treated as unregistered endpoint devices by an IMS network and, therefore, cannot take advantages of advanced services provided by an IMS network.

In addition, individual endpoints behind a Public Branch eXchange (PBX), whether it is an Internet Protocol (IP) PBX or a Time Division Multiplexing (TDM) PBX, or a Class 5 End Office (EO) switch are usually not capable of performing SIP based IMS registration as well. These endpoints are also treated as unregistered endpoints by an IMS network.

Unregistered endpoint devices are unable to fully utilize feature rich services provided by an IMS network and receive inconsistent service treatment depending on the individual IMS network.

SUMMARY OF THE INVENTION

In one embodiment, the present invention discloses a method and apparatus for enabling registration of an endpoint device that is incapable of supporting a Session Initiation Protocol (SIP) based Internet Protocol Multimedia Subsystem (IMS) registration. For example, the method performs a static registration of the endpoint device in a plurality network elements associated with an Internet Protocol Multimedia Subsystem (IMS) network by provisioning that is initiated by a service provider of the IMS network. The method processes an originating call request or a terminating call request associated with the endpoint device by an Application Server (AS) using the static registration, wherein the application server is one of the plurality network elements.

BRIEF DESCRIPTION OF THE DRAWINGS

The teaching of the present invention can be readily understood by considering the following detailed description in conjunction with the accompanying drawings, in which:

FIG. 6 illustrates a high level block diagram of a general purpose computer suitable for use in performing the functions described herein.

To facilitate understanding, identical reference numerals have been used, where possible, to designate identical elements that are common to the figures.

DETAILED DESCRIPTION

Figure 1:
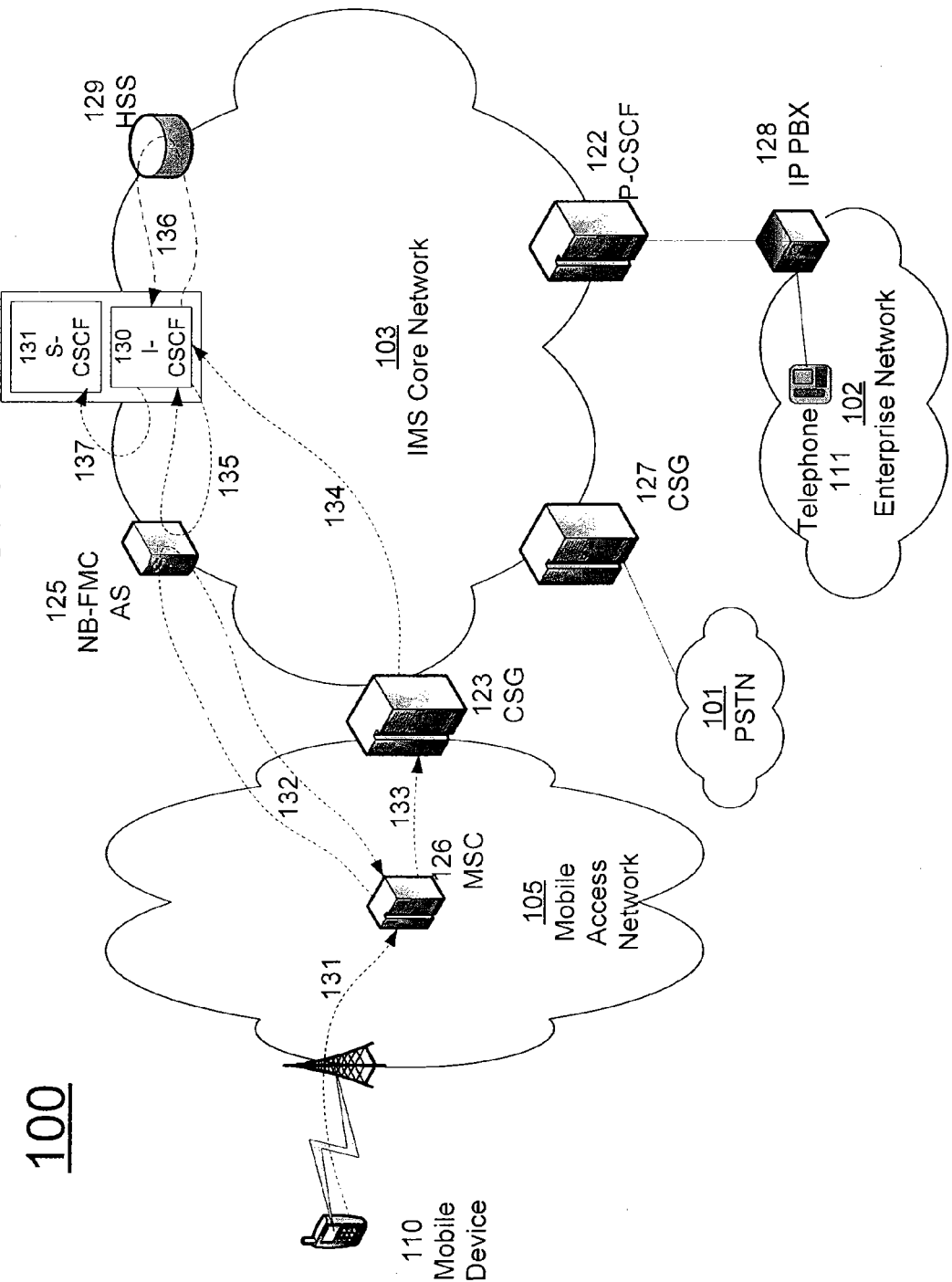
FIG. 1 illustrates an exemplary originating call flow in a network based FMC (NB-FMC) communication network related to the present invention.

As discussed above, many existing mobile phones are incapable of performing SIP based Internet Protocol Multimedia Subsystem (IMS) registrations and are treated as unregistered endpoint devices in an IMS network. For example, in Fixed Mobile Convergence, there are advantages to use the capabilities associated with a registration, including the ability of two or more different endpoints, e.g., mobile endpoints and wired endpoints, to assert or use the same Public User Identifier (PUID) and get the same services from an IMS network based on the same Service Profile. For instance, forking a call within an IMS network is a capability that is of great use to Fixed Mobile Convergence.

To address this criticality, the present invention enables registration of endpoint devices that do not support Session Initiation Protocol (SIP) based Internet Protocol Multimedia Subsystem (IMS) registration, e.g., in a Network Based Fixed Mobile Convergence (NB-FMC) network, through provisioning by a service provider. For example, the present invention allows a service provider to provision various network elements on behalf of the endpoints that are incapable of performing SIP registration so that these endpoints can be treated as registered. These network elements provisioned by a service provider may include the Serving-Call Session Control Function (S-CSCF), the Home Subscriber Server (HSS), the Proxy-Call Session Control Function (P-CSCF), and the Network Based-Fixed Mobile Convergence (NB-FMC) Application Server (AS) (broadly below referred to as an Application Server). By performing static registration through provisioning by a service provider on behalf of endpoint devices, which are incapable of performing SIP based registration, these endpoints can receive consistent service treatment in an IMS network extended to endpoint devices that are capable of SIP based registration.

In one embodiment, the present invention enables static registration of call processing network elements through provisioning initiated and performed by a service provider of an IMS network to support services for mobile endpoint devices (e.g., mobile phones, smart phones, laptops, and the like) connected via a mobile access network. Broadly defined, static registration is a registration process initiated and performed by a service provider using provisioning instead of using the standard SIP registration process performed by the endpoint devices as defined in the relevant standards. In other words, these mobile endpoint devices are incapable of performing dynamic SIP based registration with an IMS network.

In one embodiment, the call processing network elements (broadly network elements) that need to be provisioned include one or more of: the Proxy Call Session Control Function (P-CSCF), the Serving Call Session Control Function (S-CSCF), the Home Subscriber Server (HSS), and the Network Based Fixed Mobile Convergence (NB-FMC) Application Server (AS). The static registration performed via provisioning will remain in the network elements until it is changed or deleted by the service provider and will not be timed out. Furthermore, the framework of provisioning static registration in the IMS network elements initiated and performed by a service provider can be applied to other endpoints, such as IP PBX, TDM PBX, or even class 5 switch, that cannot support SIP based IMS registration connected to an IMS network via a PSTN through a Circuit Switched Gateway (CSG).

FIG. 1 illustrates an exemplary originating call flow in a network based FMC (NB-FMC) communication network related to one embodiment of the present invention. In FIG. 1, network 100 comprises a mobile access network 105, e.g., a second generation (2G), or a third generation (3G) cellular service network, an enterprise network 102, e.g., a private packet switched network using Internet Protocol (IP), an IMS core network 103, e.g., an IMS network supported by a service provider, and Public Switched Telephone Network (PSTN) 101.

In one embodiment, the mobile access network 105 is connected to the IMS core network 103 via a Circuit Switched Gateway (CSG) 123. The CSG 123 provides service interworking between a circuit switched based network and a packet switched based network. A Mobile Switching Center (MSC) 126 is the primary service delivery node for the mobile access network 105 that is responsible for handling voice service, Short Message Service (SMS) and other mobile related services.

Mobile device 110 is a mobile endpoint device, e.g., a mobile phone, a smart phone and the like, that is incapable of supporting SIP based IMS registration and the user of mobile device 110 has subscribed to NB-FMC services provided by the IMS core network 103. The user of mobile device 110 is identified by a PUID in the IMS core network 103. A PUID can be a telephone Uniform Resource Identifier (URI) or a SIP URI. Note that a PUID can be registered with one or more endpoint devices. In one embodiment, the PUID representing the user of mobile device 110 with NB-FMC service subscription is associated with a registered mobile device, e.g. mobile device 110, and a registered fixed line device, e.g., telephone 111, simultaneously.

In addition, a PUID with a set of multiple registered endpoint devices can be associated with a subset of registered endpoint devices through static registrations and the remaining subset of registered endpoint devices through standard SIP registrations. Furthermore, if an endpoint device associated with the PUID through the standard SIP registration is deregistered, it will not cause any endpoint devices associated with the PUID through static registrations to be deregistered.

PSTN network 101 is connected to the IMS core network 103 via a Circuit Switched Gateway (CSG) 127.

In one embodiment, enterprise network 102 comprises an IP Private Branch eXchange (IP-PBX) 128 which supports multiple Voice over Internet Protocol (VoIP) endpoints, such as telephone 111, in the enterprise network 102. Enterprise network 102 is connected to the IMS core network 103 via connectivity between the IP PBX 128 and the P-CSCF 122 as shown in FIG. 1.

NB-FMC AS 125, HSS 129, Interrogating Call Session Control Function (I-CSCF) 130, S-CSCF 131, P-CSCF 122 are IMS network elements that support NB-FMC service and call processing in the IMS core network 103.

In one embodiment, since the mobile device 110 does not support SIP based IMS registration directly with the IMS core network 103, static registrations will be performed using provisioning in the IMS network 103 in order to support various network services, e.g., NB-FMC services, to the mobile device 110. It should be noted that although only one mobile device 110 is illustrated in FIG. 1, the present invention is not so limited. Namely, a plurality of mobile devices 110 can be deployed in the network 100. In addition, the present invention applies to a network that supports a mixture of endpoint devices, some of which are capable of SIP based registration and some of which are incapable of SIP based registration.

In particular, the PUID associated with the user of the mobile device 110 has to be provisioned as being registered in the HSS 129, the S-CSCF 131, and the NB-FMC AS 125. Note that the Mobile Subscriber Integrated Service Digital Network (MSISDN) number that identifies the mobile device 110 is one of the two endpoints which is registered to the same PUID. In addition, the subscriber profile containing the subscription related information of the PUID associated with the user of mobile device 110 has to be provisioned in the HSS 129 so that the S-CSCF 131 can retrieve the information to perform call processing when needed or has to be provisioned in the S-CSCF 131. Subscription related information includes the route headers needed to access the endpoint, the capabilities of the registration (e.g., voice, video services and the like) and the priorities of the registration. For instance, the SIP Uniform Resource Identifier (URI) of the S-CSCF, e.g., the SIP URI of S-CSCF 131, that is used to process a call originating from or terminating to the PUID associated with the user of the mobile device 110 has to be provisioned in the HSS 129.

Referring back to FIG. 1, an originating call flow initiated by the mobile device 110 is now described. In FIG. 1, the user of mobile device 110 represented by a PUID has subscribed to NB-FMC services with the IMS core network 103 and originates a call from mobile device 110 using flow 131. Upon receiving the call request, the MSC 126 in the originating mobile access network 105 issues a Customized Application for Mobile Network Enhanced Logic (CAMEL) request to the NB-FMC AS 125 using flow 132.

In one embodiment, the NB-FMC AS 125 is provisioned to treat the PUID associated with the user of mobile device 110, referred as the calling party hereafter, as being registered. As a result, the NB-FMC AS 125 stores the phone number dialed by the mobile device 110, and returns an IMS Routing Number (IMRN) back to the MSC 126 using flow 132 for further processing. MSC 126 uses the returned IMRN to route the call to the CSG 123 using flow 133 for further processing.

The CSG 123 formulates a SIP INVITE message with the SIP Private Asserted Identity (PAI) and the From header set to the MSISDN number of mobile device 110 and the SIP Request-URI (R-URI) header set to the previously returned IMRN and sends the INVITE message to the I-CSCF 130 using flow 134 for processing.

The I-CSCF 130 queries the HSS 129, where the HSS 129 maps the IMRN to the SIP URI of the NB-FMC AS 125 and returns the SIP URI to the I-CSCF 130 using flow 136. The I-CSCF sends the SIP INVITE message to the NB-FMC AS 125 using flow 135. The NB-FMC AS 125 associates this INVITE message with the previous CAMEL trigger request and returns the INVITE message using flow 135 with the From header set to the calling party (e.g., the PUID associated with the user of mobile device 110), the PAI header set to MSISDN number of mobile device 110, and the R-URI header set to the dialed number to the I-CSCF 130.

I-CSCF 130 then queries the HSS 129 using flow 136 and the HSS 129 identifies the S-CSCF 131 assigned during the provisioned registration associated with the calling party. HSS 129 is provisioned with the subscriber profile of the calling party and the SIP URI of the S-CSCF, e.g., S-CSCF 131, to which the call is sent to for further processing.

I-CSCF 130 sends the INVITE message to the S-CSCF 131 using flow 137 for call processing. Normal call processing continues from this point on within the IMS core network 103. Note that the S-CSCF 131 has been provisioned to treat the calling party as being registered. In one embodiment, the S-CSCF 131 is also provisioned with the subscriber profile of the calling party or retrieves, if necessary, the subscriber profile of the calling party from the HSS 129.

Note that the framework of the aforementioned originating call flow can be applied to support a call request initiated from an IP PBX, a TDM PBX, or a class 5 switch connected via a PSTN to an IMS network through a CSG in a similar fashion.

Furthermore, in contrast to a call request received via a CSG, if telephone 111 in FIG. 1 is incapable of SIP registration and originates a call request via IP PBX 128 and P-CSCF 122, the PUID associated with the user of telephone 111 has to be provisioned as registered and the SIP URI of the S-CSCF to which the call signaling message has to be sent, e.g., the SIP URI of S-CSCF 131, has to be provisioned in the P-CSCF 122.

Figure 2:
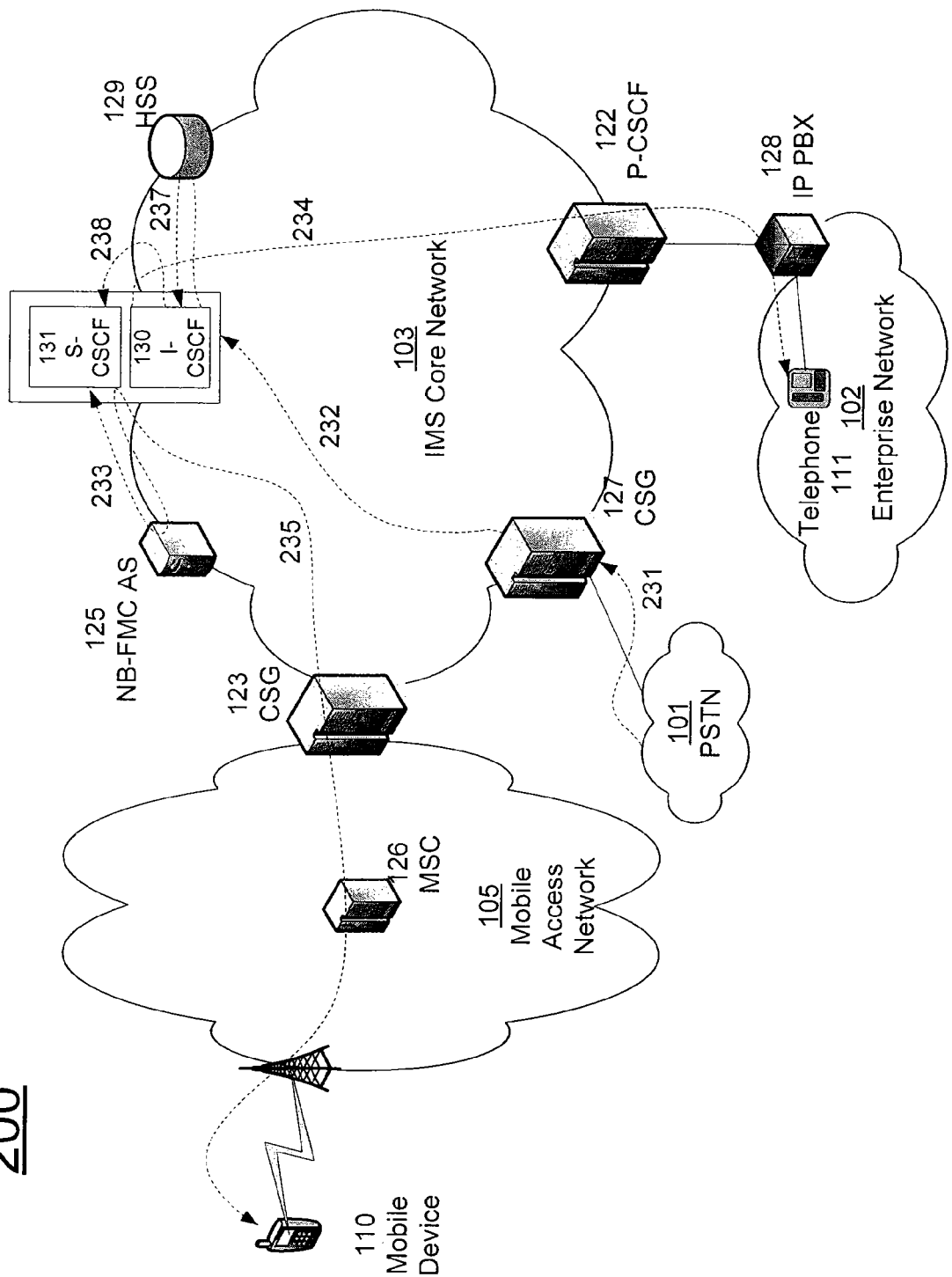
FIG. 2 illustrates an exemplary terminating call flow of an exemplary network based FMC (NB-FMC) communication network related to the present invention.

FIG. 2 illustrates an exemplary terminating call flow in a network based FMC (NB-FMC) communication network related to one embodiment of the present invention. In FIG. 2, network 200 is the same network as network 100 as shown in FIG. 1 in terms of the network components. Referring now to FIG. 2, a terminating call flow destined to a user of NB-FMC service is described.

In FIG. 2, a call destined to the mobile device 110 (e.g., directed to the MSISDN number of mobile device 110 which is registered to the PUID representing the user with NB-FMC service subscription) is received from the PSTN 101 through the CSG 127 using flow 231. CSG 127 formulates a SIP INVITE message and sends it to the I-CSCF 130 using flow 232.

In one embodiment, the I-CSCF 130 queries the HSS 129 using flow 237 to identify the S-CSCF, in this case S-CSCF 131, associated with the PUID of the user of mobile device 110, provisioned during the static registration. The I-CSCF 130 sends the INVITE message to the S-CSCF 131 using flow 238 with the PAI header set to the calling party number and the R-URI header set to the dialed number (e.g., the MSISDN number of mobile device 110).

Based on an initial Filter Criteria (iFC), the S-CSCF 131 sends the INVITE message to the appropriate AS for terminating processing and then to the NB-FMC AS 125 using flow 233 for terminating FMC processing and anchoring. The NB-FMC AS 125 sends the INVITE message to S-CSCF 131 comprising the R-URI header set to the PUID associated with the user of mobile device 110, referred as the called party hereafter. It should be noted that "an appropriate AS" can be any AS that is required to perform certain specific call processing functions in order to complete a call request. For instance, for a call request that involves a toll free telephone number, a special AS may be required to translate the toll free phone number into a regular phone number.

The S-CSCF 131 determines that terminating processing is complete. To illustrate the support of advanced feature capabilities (broadly Fixed Mobile Convergence (FMC) capabilities or services) by an NB-FMC IMS network, an example of the simultaneous ringing service feature, that involves ringing to both a mobile phone and a land line phone simultaneously, is described hereafter. Based on the provisioned registration information associated with the called party available to the S-CSCF 131, the S-CSCF 131 determines that simultaneous ringing should be provided to both the telephone 111 (using flow 234) and the mobile device 110 (using flow 235). Note that the mobile device 110 and telephone 111 are both registered to be associated with the called party in this case. Normal call flow continues from this point on.

Note that the S-CSCF 131 is provisioned to treat the called party as being registered. The S-CSCF 131 is provisioned with the subscriber profile of the called party or retrieves, if necessary, the subscriber profile and the required entries associated with the called party from the HSS 129. The required SIP Registrar entries at the S-CSCF 131 includes the route headers needed to access the endpoint, the capabilities of the registration (e.g., voice, video services and the like) and the priorities of the registration. Broadly defined, a SIP Registrar (e.g., deployed in a network server or within another network device such as a S-CSCF) in an IMS network accepts and processes SIP REGISTER requests. The SIP registrar provides a location service which registers one or more IP addresses or telephone numbers to a certain PUID. More than one User Agent can register at the same PUID, with the result that all registered user agents will receive a call to the PUID.

Furthermore, in order to execute the simultaneous ringing feature, if the IP PBX 128 and the telephone 111 cannot support IMS registration directly with the IMS core network 103, then the S-CSCF 131 needs to be provisioned with the SIP URI of the P-CSCF, in this case P-CSCF 122, to which the call session message associated with call termination to the telephone 111 is sent for call processing. The P-CSCF 122 also needs to be provisioned to treat the called party as being registered.

It should be noted that the simultaneous ringing service feature as described above is only illustrative and the any other service features supported by the NB-FMC IMS network are within the scope of the present invention.

Figure 3:
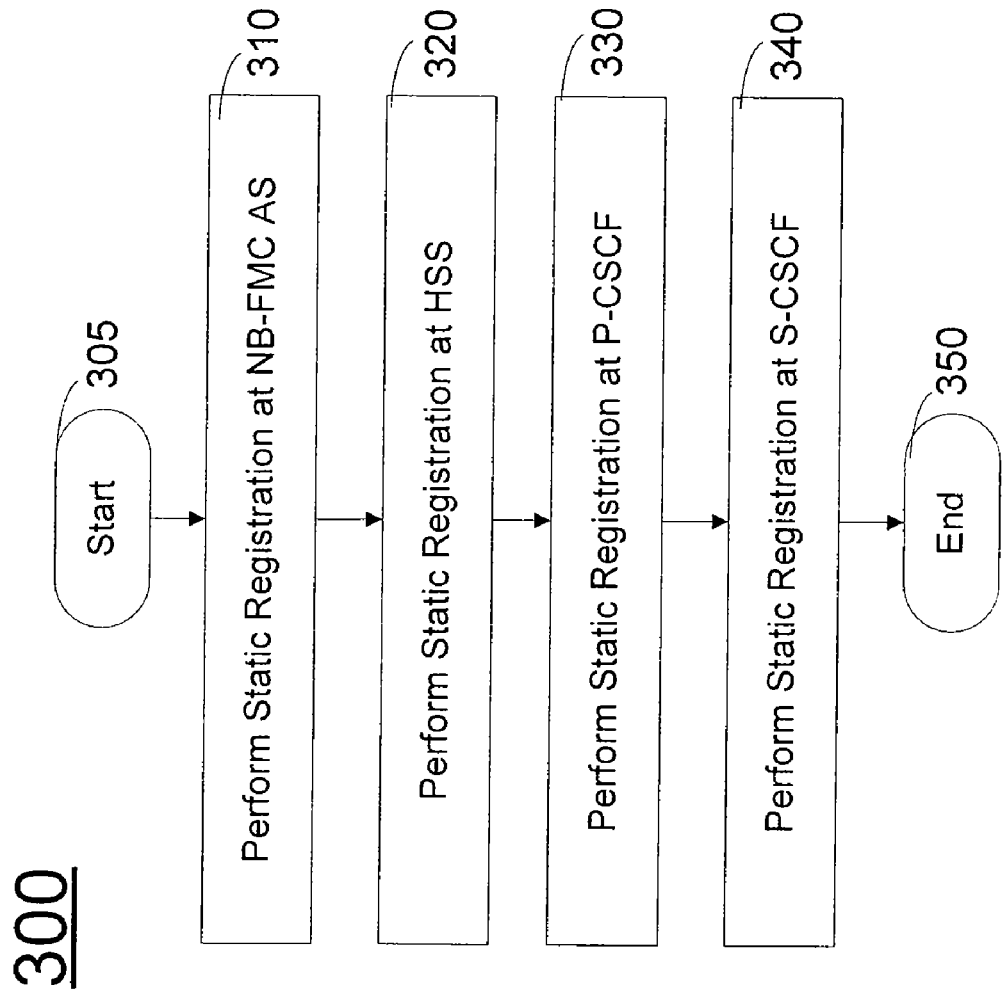
FIG. 3 illustrates a flowchart of a method of performing static registration by provisioning in a NB-FMC communication network of the present invention.

FIG. 3 illustrates a flowchart of method 300 of performing static registration by provisioning in a NB-FMC communication network of the present invention. The static registration provisioned is associated with an endpoint device that is incapable of performing SIP based IMS registration directly with an IMS network. Method 300 starts in step 305 and proceeds to step 310.

In step 310, the method provisions the PUID associated with the user of an endpoint device which is incapable of performing standard SIP registration as registered at the NB-FMC AS. For example, the PUID associated with the user of a mobile phone endpoint device which is incapable of performing standard SIP registration or the PUID associated with the user for a wired telephone endpoint device which is incapable of performing standard SIP registration and the like can be provisioned as being registered at the NB-FMC AS.

In step 320, the method provisions the PUID associated with the user of an endpoint device which is incapable of performing standard SIP registration as registered and the subscriber profile comprising subscription related information including the route headers needed to access the endpoint, the capabilities of the registration (e.g., voice, video services and the like) and the priorities of the registration at the HSS. For instance, the HSS is provisioned with the address of the S-CSCF that will be used to perform call processing for the registered PUID and the type of services that the user of the registered PUID has subscribed to within the IMS network. The HSS will respond to any queries indicating that a PUID is registered with a specific S-CSCF. Any changes to a subscriber profile including the PUID will be sent to the specific S-CSCF for update.

In step 330, the method provisions the PUID associated with the user of an endpoint device which is incapable of performing standard SIP registration as registered and the address of the S-CSCF that will be used to perform call processing associated with the registered PUID at the P-CSCF.

In step 340, the method provisions the PUID associated with the user of an endpoint device which is incapable of performing standard SIP registration as registered, the subscriber profile of the registered PUID comprising subscription related information including the route headers needed to access the endpoint, the capabilities of the registration (e.g., voice, video services and the like) and the priorities of the registration at the S-CSCF. For instance, the S-CSCF is provisioned with the address of the P-CSCF that will be used to perform call processing for the registered PUID and the type of services that the user of the registered PUID has subscribed to within the IMS network. The method ends in step 350.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Note that steps or blocks 310 to 340 in FIG. 3 can be performed in any order.

Figure 4:
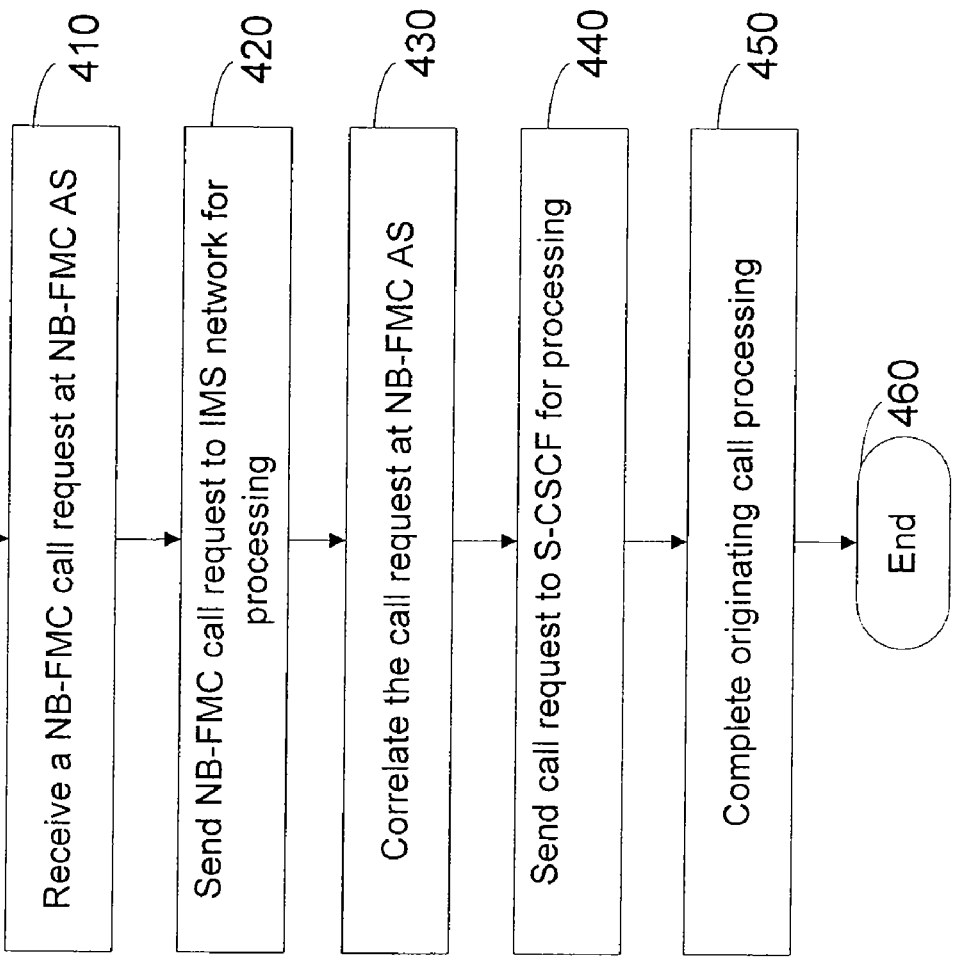
FIG. 4 illustrates a flowchart of a method of processing an originating call flow in a NB-FMC communication network of the present invention.

FIG. 4 illustrates a flowchart of method 400 of processing an originating call flow in a NB-FMC communication network of the present invention. Method 400 starts in step 405 and proceeds to step 410.

In step 410, the method receives a call request (e.g., a NB-FMC call request) from an endpoint device at the NB-FMC AS via an access network. In one embodiment, the call request can be sent from the endpoint device to a MSC in a mobile access network and the MSC then sends a Customized Application for Mobile Network Enhanced Logic (CAMEL) request to the NB-FMC AS for processing. Note that the NB-FMC AS has been provisioned to treat the PUID associated with the user of the endpoint device, referred as the calling party hereafter, as registered. NB-FMC AS stores the phone number dialed by the endpoint device, the dialed number, and returns an IMS Routing Number (IMRN) back to the appropriate network element, e.g., the MSC, in the originating access network.

In step 420, the method forwards the call request using the returned IMRN to route the call from the MSC in the originating access network to a CSG associated with the IMS network. The CSG then formulates a SIP INVITE message with the SIP PAI and the From header set to the phone number of the originating endpoint device, e.g., a MSISDN number, and the SIP Request-URI (R-URI) header set to the previously returned IMRN and sends the INVITE message to the I-CSCF for processing. The I-CSCF queries the HSS and the HSS maps the IMRN to a SIP URI of the same NB-FMC AS previously accessed and returns the SIP URI to the I-CSCF. The I-CSCF then sends the SIP INVITE message to the NB-FMC AS using the returned SIP URI of the NB-FMC AS.

In step 430, the NB-FMC AS associates this INVITE message with the previous call request in step 410 and returns the INVITE message with the From header set to the calling party (the PUID associated with the user of the endpoint device), the PAI header set to the phone number of the originating endpoint device (e.g., the MSISDN number), and the R-URI header set to the dialed number to the I-CSCF. The I-CSCF then queries the HSS and the HSS identifies the S-CSCF assigned during the provisioned registration associated with the calling party. The HSS is provisioned with the subscriber profile of the calling party and the SIP URI of the S-CSCF to which the call is sent to for further processing.

In step 440, the I-CSCF sends the INVITE message to the assigned S-CSCF for call processing. Note that the S-CSCF has been provisioned to treat the calling party as registered. The S-CSCF is provisioned with the subscriber profile of the calling party or retrieves, if necessary, the subscriber profile from the HSS.

In step 450, the method completes the normal call processing within IMS core network. The method ends in step 460.

It should be noted that although not specifically specified, one or more steps of method 400 may include a storing, displaying and/or outputting step as required for a particular application. In other words, any data, records, fields, and/or intermediate results discussed in the method 400 can be stored, displayed and/or outputted to another device as required for a particular application. Furthermore, steps or blocks in FIG. 4 that recite a determining operation, or involve a decision, do not necessarily require that both branches of the determining operation be practiced. In other words, one of the branches of the determining operation can be deemed as an optional step.

Figure 5:
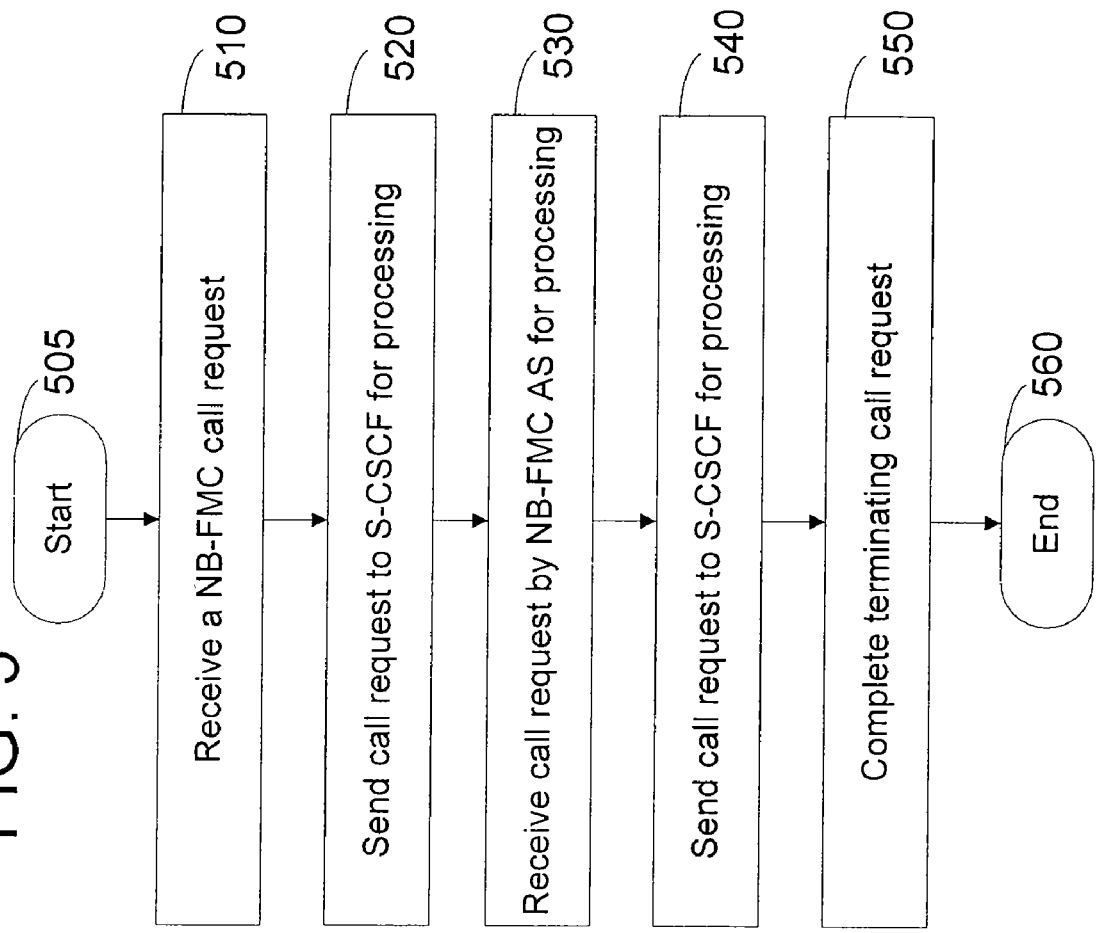
FIG. 5 illustrates a flowchart of a method of processing a terminating call flow in a NB-FMC communication network of the present invention.

FIG. 5 illustrates a flowchart of method 500 of processing a terminating call flow in a NB-FMC communication network of the present invention. Method 500 starts in step 505 and proceeds to step 510.

In step 510, the method receives a call destined to a dialed number with NB-FMC service subscription in an IMS network. For example, the call is received through a CSG. In turn, the CSG formulates a SIP INVITE message and sends it to the I-CSCF.

In step 520, the I-CSCF sends the SIP INVITE message to an identified S-CSCF. More specifically, the I-CSCF queries the HSS to identify the S-CSCF associated with the PUID associated with the user of the dialed number, provisioned during the static registration. The I-CSCF sends the INVITE message to the identified S-CSCF with the PAI header set to the calling party number and the R-URI header set to the dialed number.

In step 530, the S-CSCF sends the INVITE message to the appropriate AS for terminating processing and then to the NB-FMC AS used for terminating FMC processing and anchoring. In turn, the NB-FMC AS sends the INVITE message to the S-CSCF comprising the R-URI header set to the PUID associated with the user of the dialed number, referred as the called party hereafter.

In step 540, the S-CSCF receives the INVITE message for processing. The S-CSCF determines that the terminating processing is complete. Based on the registration information in the SIP Registrar associated with the called party, whether it is statically registered via provisioning or dynamically registered via standard SIP registration, that is available at the S-CSCF, the S-CSCF determines that simultaneous ringing should be provided to the called party comprising one or more registered endpoint devices, e.g., one or more fixed and mobile endpoint devices, associated with the called party.

In step 550, the method completes the normal call processing within IMS core network. The method ends in step 560.

Note that in method 500, the S-CSCF has been provisioned to treat the called party as registered. The S-CSCF has been provisioned with the subscriber profile of the called party or retrieves the subscriber profile and the required entries associated with the called party from the HSS. The required SIP Registrar entries at the S-CSCF includes the route headers needed to access the endpoint, the capabilities of the registration (e.g., voice, video services and the like) and the priorities of the registration.

It should be noted that although not specifically specified, one or more steps of method 500 may include a storing, displaying and/or outputting step as required for a particular application. In other words, any data, records, fields, and/or intermediate results discussed in the method 500 can be stored, displayed and/or outputted to another device as required for a particular application. Furthermore, steps or blocks in FIG. 5 that recite a determining operation, or involve a decision, do not necessarily require that both branches of the determining operation be practiced. In other words, one of the branches of the determining operation can be deemed as an optional step.

FIG. 6 depicts a high level block diagram of a general purpose computer suitable for use in performing the functions described herein. As depicted in FIG. 6, the system 600 comprises a processor element 602 (e.g., a CPU), a memory 604, e.g., random access memory (RAM) and/or read only memory (ROM), a module 605 for enabling registration of endpoint devices that do not support Session Initiation Protocol (SIP) based Internet Protocol Multimedia Subsystem (IMS) registration in a Fixed Mobile Convergence (FMC) network through provisioning, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 605 for enabling registration of endpoint devices that do not support Session Initiation Protocol (SIP) based Internet Protocol Multimedia Subsystem (IMS) registration in a Fixed Mobile Convergence (FMC) network through provisioning can be loaded into memory 604 and executed by processor 602 to implement the functions as discussed above. As such, the present process 605 for enabling registration of endpoint devices that do not support Session Initiation Protocol (SIP) based Internet Protocol Multimedia Subsystem (IMS) registration in a Fixed Mobile Convergence (FMC) network through provisioning by (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for enabling registration of an endpoint device that is incapable of supporting a session initiation protocol based internet protocol multimedia subsystem registration, comprising:
    performing a static registration of the endpoint device that is incapable of supporting the session initiation protocol based Internet protocol multimedia subsystem registration in a plurality of network elements associated with an internet protocol multimedia subsystem network, wherein the static registration comprises a registration process that is initiated and performed by a service provider of an Internet protocol multimedia subsystem communication network using a provisioning process; and
    processing a call request associated with the endpoint device by an application server using the static registration, wherein the application server is one of the plurality of network elements.

2. The method of claim 1, wherein the plurality of network elements comprises a home subscriber server, a proxy call session control function, and a serving call session control function.

3. The method of claim 1, wherein the static registration is not timed out by the plurality of network elements.

4. The method of claim 1, wherein the internet protocol multimedia subsystem network is in communication with a mobile access network.

5. The method of claim 1, wherein the endpoint device comprises a mobile endpoint device.

6. The method of claim 2, wherein the performing comprises:
    provisioning the home subscriber server, the serving call session control function, the proxy call session control function, and the application server to treat a public user identifier associated with a user of the endpoint device as being registered; and
    provisioning a subscriber profile for the public user identifier associated with the user of the endpoint device comprising subscription related information including a plurality route headers needed to access the endpoint device, a capability, and a priority at the home subscriber server and the serving call session control function.

7. The method of claim 2, wherein the performing comprises:
    provisioning a session initiation protocol uniform resource identifier of the serving call session control function at the proxy call session control function that will be used to perform call processing for a public user identifier associated with a user of the endpoint device; and
    provisioning a session initiation protocol uniform resource identifier of the proxy call session control function at the serving call session control function that will be used to perform call processing for the public user identifier associated with the user of the endpoint device.

8. The method of claim 2, wherein the processing the call request comprises:
    receiving an originating call request from the endpoint device via an access network;
    storing and tracking a called party number, and a calling party number associated with the originating call request; and
    returning an internet protocol multimedia subsystem routing number to the access network.

9. The method of claim 8, wherein the originating call request is received via a circuit switched gateway.

10. The method of claim 8, wherein the processing the originating call request further comprises:
    mapping the internet protocol multimedia subsystem routing number to a session initiation protocol uniform resource identifier of the application server by the home subscriber server and routing a second call request to the application server;
    associating the routed second call request with the originating call request and replacing a from header of the second request with a public user identifier associated with a user of the endpoint device, a private asserted identity header of the second request with a phone number of the endpoint device, and a request uniform resource identifier header of the second call request with the called party number; and sending the second call request to the serving call session control function for call completion processing.

11. The method of claim 2, wherein the processing the call request comprises:
   receiving a terminating call request terminating to the endpoint device;
   sending the terminating call request to the application server by the serving call session control function for processing; and
   sending the terminating call request by the application server back to the serving call session control function for call completion processing.

12. The method of claim 11, wherein the terminating call request is received via a circuit switched gateway.

13. The method of claim 1, wherein the application server supports a network based fixed mobile convergence service.

14. A non-transitory computer-readable storage medium having stored thereon a plurality of instructions, the plurality of instructions including instructions which, when executed by a processor, cause the processor to perform a method for enabling registration of an endpoint device that is incapable of supporting a session initiation protocol based internet protocol multimedia subsystem registration, comprising:
   performing a static registration of the endpoint device that is incapable of supporting the session initiation protocol based internet protocol multimedia subsystem registration in a plurality of network elements associated with an internet protocol multimedia subsystem network, wherein the static registration comprises a registration process that is initiated and performed by a service provider of an internet protocol multimedia subsystem communication network using a provisioning process; and
   processing a call request associated with the endpoint device by an application server using the static registration, wherein the application server is one of the plurality of network elements.

15. The non-transitory computer-readable storage medium of claim 14, wherein the plurality of network elements comprises a home subscriber server, a proxy call session control function, and a serving call session control function.

16. The non-transitory computer-readable storage medium of claim 14, wherein the static registration is not timed out by the plurality of network elements.

17. The non-transitory computer-readable storage medium of claim 14, wherein the internet protocol multimedia subsystem network is in communication with a mobile access network.

18. The non-transitory computer-readable storage medium of claim 14, wherein the endpoint device comprises mobile endpoint device.

19. The non-transitory computer-readable storage medium of claim 15, wherein the performing comprises:
   provisioning the home subscriber server, the serving call session control function, the proxy call session control function, and the application server to treat a public user identifier associated with a user of the endpoint device as being registered; and
   provisioning a subscriber profile for the public user identifier associated with the user of the endpoint device comprising subscription related information including a plurality route headers needed to access the endpoint device, a capability, and a priority at the home subscriber server and the serving call session control function.

20. A system for enabling registration of an endpoint device that is incapable of supporting a session initiation protocol based internet protocol multimedia subsystem registration, comprising:
   an application server having a processor and a computer-readable medium in communication with the processor, wherein the computer-readable medium has stored thereon a plurality of instructions, the plurality of instructions including instructions which, when executed by the processor, cause the processor to perform a method, comprising:
      performing a static registration of the endpoint device that is incapable of supporting the session initiation protocol based Internet protocol multimedia subsystem registration, wherein the application server is associated with an internet protocol multimedia subsystem network, wherein the static registration comprises a registration process that is initiated and performed by a service provider of the internet protocol multimedia subsystem communication network using a provisioning process; and
      processing a call request associated with the endpoint device by using the static registration.

* * * * *